United States Patent
Kong et al.

(10) Patent No.: US 10,341,570 B1
(45) Date of Patent: Jul. 2, 2019

(54) ASSEMBLY AND METHOD FOR RESTRICTING INDEFINITE ONE-WAY ROTATION OF A ROTATABLE CAMERA

(71) Applicant: Honeywell International Inc., Morristown, NJ (US)

(72) Inventors: Lei Kong, Shanghai (CN); Kevin Gao, Shanghai (CN); Lili Zou, Shanghai (CN)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 15/949,704

(22) Filed: Apr. 10, 2018

(51) Int. Cl.
| H04N 7/18 | (2006.01) |
| H04N 5/225 | (2006.01) |
| H04N 5/232 | (2006.01) |
| F16M 11/12 | (2006.01) |
| F16M 11/18 | (2006.01) |

(52) U.S. Cl.
CPC ....... *H04N 5/23296* (2013.01); *F16M 11/123* (2013.01); *F16M 11/18* (2013.01); *H04N 5/2253* (2013.01); *H04N 7/183* (2013.01); *F16M 2200/024* (2013.01)

(58) Field of Classification Search
CPC .. H04N 5/2253; H04N 5/23296; H04N 7/183; F16M 11/123; F16M 11/18; F16M 2200/024
See application file for complete search history.

(56) References Cited

U.S. PATENT DOCUMENTS

| 3,758,205 A * | 9/1973 | Oxbery | G03B 27/323 |
| | | | 355/18 |
| 4,855,823 A | 8/1989 | Struhs et al. | |
| 7,364,128 B2 * | 4/2008 | Donaldson | F16M 13/02 |
| | | | 248/183.4 |
| 7,614,804 B2 * | 11/2009 | Kim | G03B 17/561 |
| | | | 348/373 |
| 8,558,945 B2 * | 10/2013 | Yamauchi | G03B 15/00 |
| | | | 348/373 |
| 9,426,340 B2 * | 8/2016 | Song | H04N 5/2252 |
| 9,692,951 B2 * | 6/2017 | Stark | F16M 13/02 |
| 9,952,485 B1 * | 4/2018 | Luski | G03B 17/561 |
| 2008/0259159 A1 | 10/2008 | Nystrom | |

* cited by examiner

*Primary Examiner* — Ngoc Yen T Vu
(74) *Attorney, Agent, or Firm* — Husch Blackwell LLP

(57) ABSTRACT

An assembly for a rotatable surveillance camera is disclosed. The assembly can include a gimbal ring, a base securable to the gimbal ring and a flexible hook member securable to the base. The gimbal ring can have a slotted channel recessed into an interior surface. The slotted channel can have a spiral configuration with opposing ends and can extend around the interior of the gimbal ring at least one full revolution. The base can have a side wall with a slot provided through at least a portion thereof. The hook member can have a proximal end within the interior of the base and can extend outside the base through the slot to an opposing end having a tab. The slotted channel can receive the tab and be slidably rotated around said tab between the opposing ends during rotation of the gimbal ring relative the base.

17 Claims, 11 Drawing Sheets

ASSEMBLY AND METHOD FOR RESTRICTING INDEFINITE ONE-WAY ROTATION OF A ROTATABLE CAMERA

FIELD

Embodiments presented herein relate generally to rotating cameras such as, for example, 360 degree rotatable surveillance cameras, and more particularly to an assembly and method for restricting indefinite one-way rotation of such camera.

BACKGROUND

Security or surveillance cameras that can rotate 360 degrees about an axis are generally well-known and can be useful for monitoring multiple segments of a designated area to eliminate the need for multiple different cameras in different locations. As is generally known, such rotating camera designs commonly have a stationary base portion and a rotatable camera portion which can be set on or in the base. Typically, the base portion can be fixedly mounted or secured to a support structure and/or a portion of a building structure such as a ceiling or wall and the rotatable camera portion can rotate about the base in a clockwise or counterclockwise direction. It is generally known that rotation of such cameras can be actuated and controlled remotely and thus cables or wires must typically extend into the camera housing to connect to the camera and or rotatable portion to provide power and control signals for operation.

It has been recognized that conventional rotatable camera designs do not provide any features or capabilities which can effectively prevent or restrict rotation of the rotatable camera portion in a single direction. As a result, the rotatable camera portion is free to rotate continuously in one direction without limit. It has been observed that such continuous one-way rotation can cause the internal cables or wires that are connected to the rotatable portion (and/or to camera or control circuitry on the rotatable portion) to become unduly twisted, tangled or entwined. Where such condition occurs, it has been observed that the wires can break or become damaged, frayed or disconnected from the camera or control circuitry thus rendering the camera and/or rotatable portion inoperable.

In view of this troublesome condition, there is a need in the art for a mechanism and assembly for controlling or restricting indefinite or excessive one-way rotation of the camera and to prevent the internal wires or cables from becoming excessively twisted and damaged. There is further a need in the art for a rotatable camera assembly providing such assembly. There is also a need in the art for a method of restricting indefinite rotation of a rotatable camera.

DETAILED DESCRIPTION

Figure 1A:
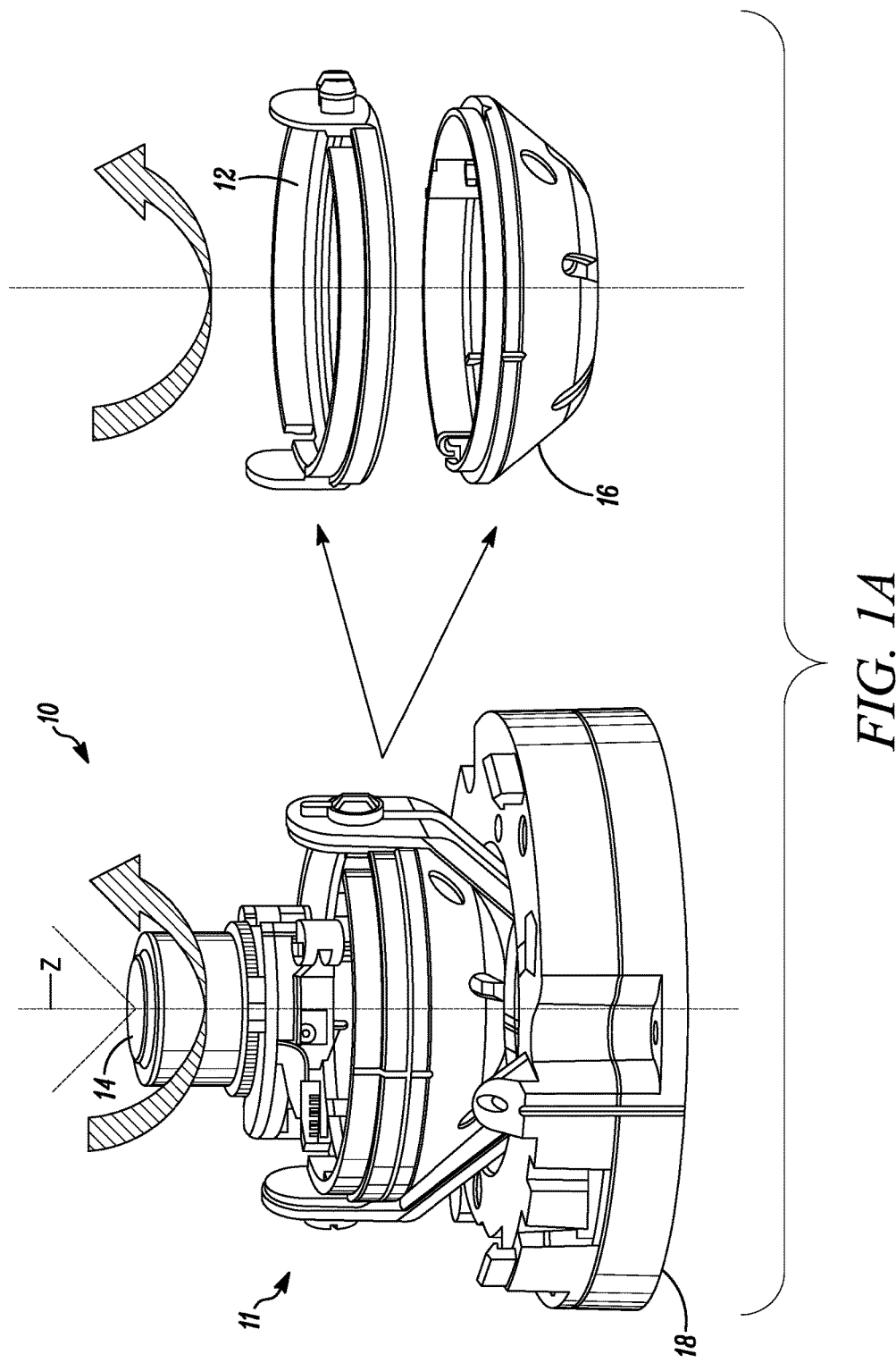
FIGS. 1A and 1B are schematic perspective views of a rotatable camera according to an exemplary embodiment.

While the subject invention is susceptible of embodiment in many different forms, there are shown in the drawings, and will be described herein in specific detail, embodiments thereof with the understanding that the present disclosure is to be considered as an exemplification of the principles of the invention and is not intended to limit the invention to the specific embodiments illustrated.

Figure 1B:
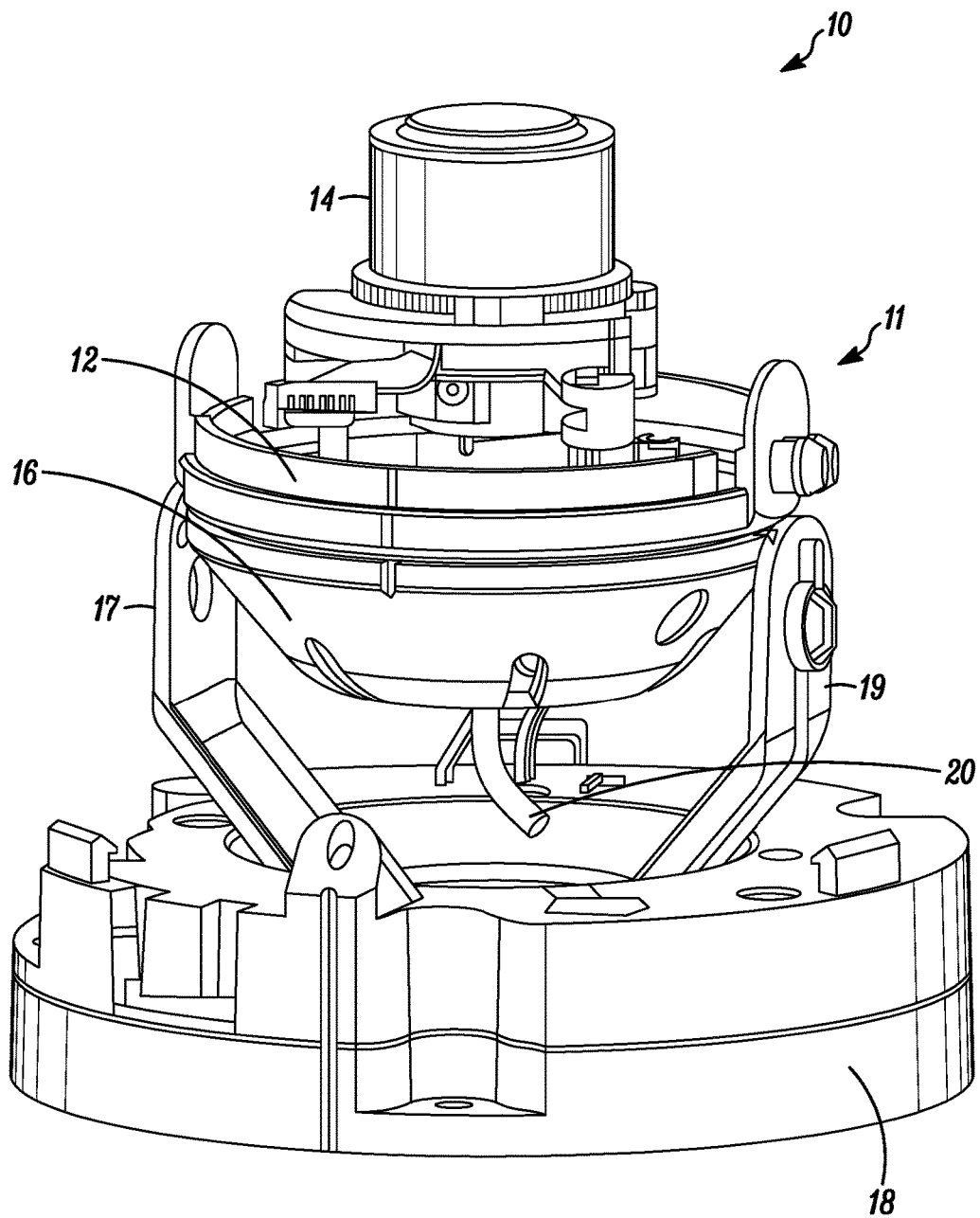

With reference now to the figures, FIGS. 1A and 1B illustrate a rotatable camera 10 according to an exemplary embodiment presented herein. As shown schematically in FIG. 1A, camera 10 can have a gimbal assembly 11, a camera assembly 14 and a stationary support structure 18. Gimbal assembly 11 can have a rotatable portion shown as a gimbal ring 12, and a gimbal cover or base 16. According to an exemplary embodiment as shown schematically in FIG. 1A, gimbal ring 12 can be rotationally secured or seated on or against gimbal base 16 and can rotate relative base 16 in a clockwise and counterclockwise direction; such rotation actuating rotation of the camera of camera assembly about axis of rotation Z. Gimbal ring 12 can be supported by, or suspended from, brackets or arms 17, 19 of support structure 18. Support structure 18 can be securable to a mounting surface (not shown) of building structure with the camera lens oriented away from, or opposite, the mounting surface.

In FIG. 1B, camera assembly 14 and gimbal assembly 11 including gimbal ring 12 and base 16 are shown for reference as being removed/elevated from arms 17, 19 of support structure 18. As illustrated in FIG. 1B, cables or wiring 20 can extend into the interior of assembly 11 through base 16 in an area opposite the camera assembly 14. According to an exemplary embodiment, a drive mechanism, controller and associated control circuitry can be provided on the camera assembly 14 (or elsewhere) and can be configured to receive and process signals for actuating and controlling rotation of the gimbal ring 12 and camera. Cables or wiring 20 can extend though the base and be connected to the camera, drive mechanism, controller and/or control circuitry and can supply power and control signals to the camera, drive mechanism and control circuitry and/or audio or video signals to the camera.

Figure 2:
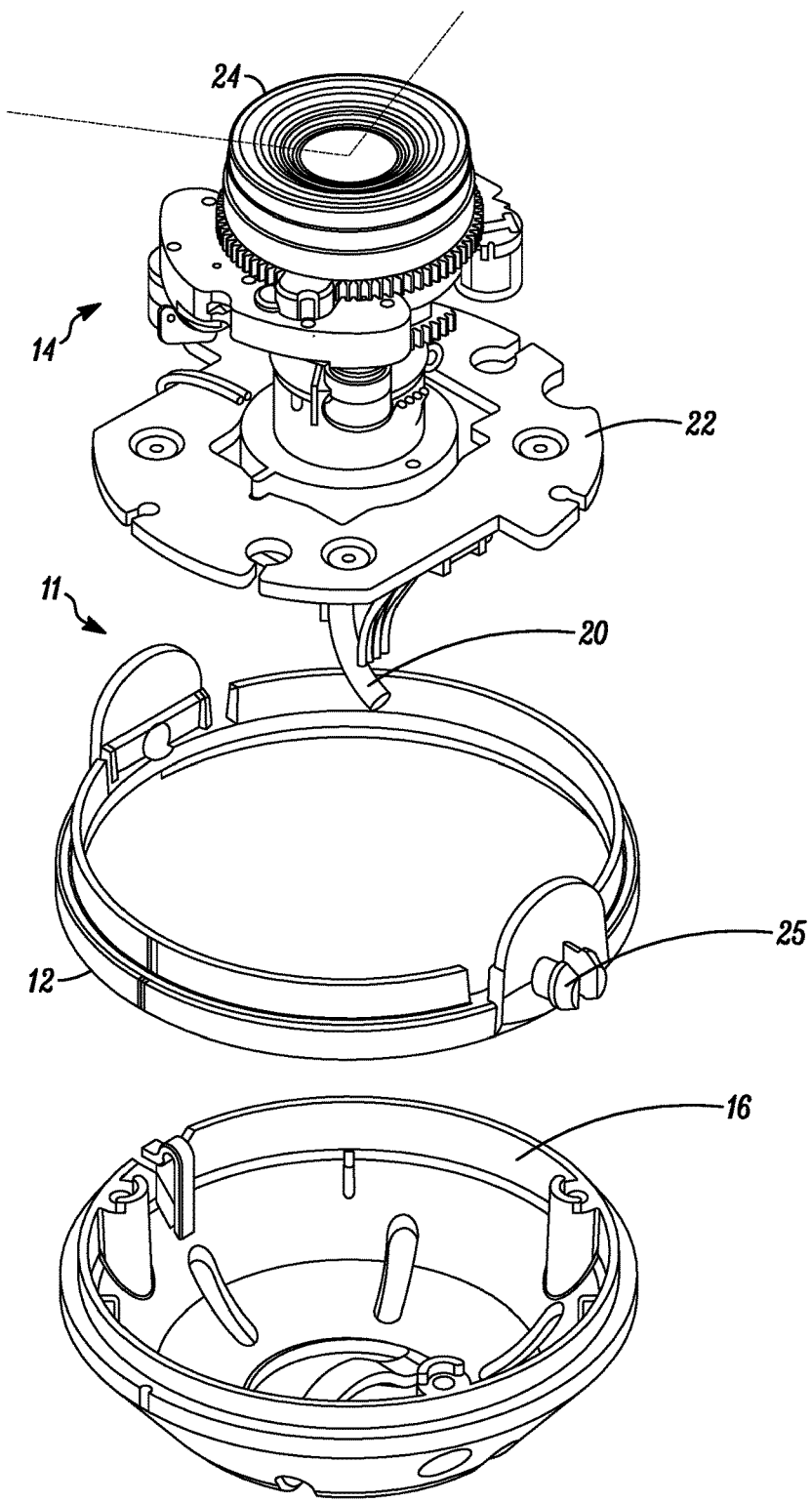
FIG. 2 is a schematic exploded view of a rotatable camera and gimbal assembly according to an exemplary embodiment.

FIG. 2 illustrates an exploded view of the gimbal assembly 11. As shown schematically in FIG. 2B, gimbal ring 12 can have a generally annular shape having a central opening and camera assembly 14 can include a base plate 22 sized and shaped to fit within the central opening of gimbal ring 12. Base plate 22 can be securable to at least one of the gimbal ring 12 or base 16. Base plate 22 can support camera 24 with camera extending in a generally axial direction from base plate 22. Cables or wiring 20 can extend to the camera assembly 14 from a side of base plate 22 opposite camera 24.

As illustrated in FIG. 2, gimbal ring 12 can include mounting tabs 25 extending outward from an exterior surface of gimbal ring 12 for engaging corresponding connection points or apertures on arms 17, 19 of support structure 18 (See FIG. 1B). Mounting tabs 25 can be on opposing sides of the gimbal ring 12 (i.e. spaced on the order of 180 degrees from one another along ring 12). Gimbal base 16 can have a bowl-shaped design featuring an open end with an annular-shaped rim defining a central opening with said opening extending into an interior portion or cavity defined by the side wall of base 16.

Figures 3, 3A:
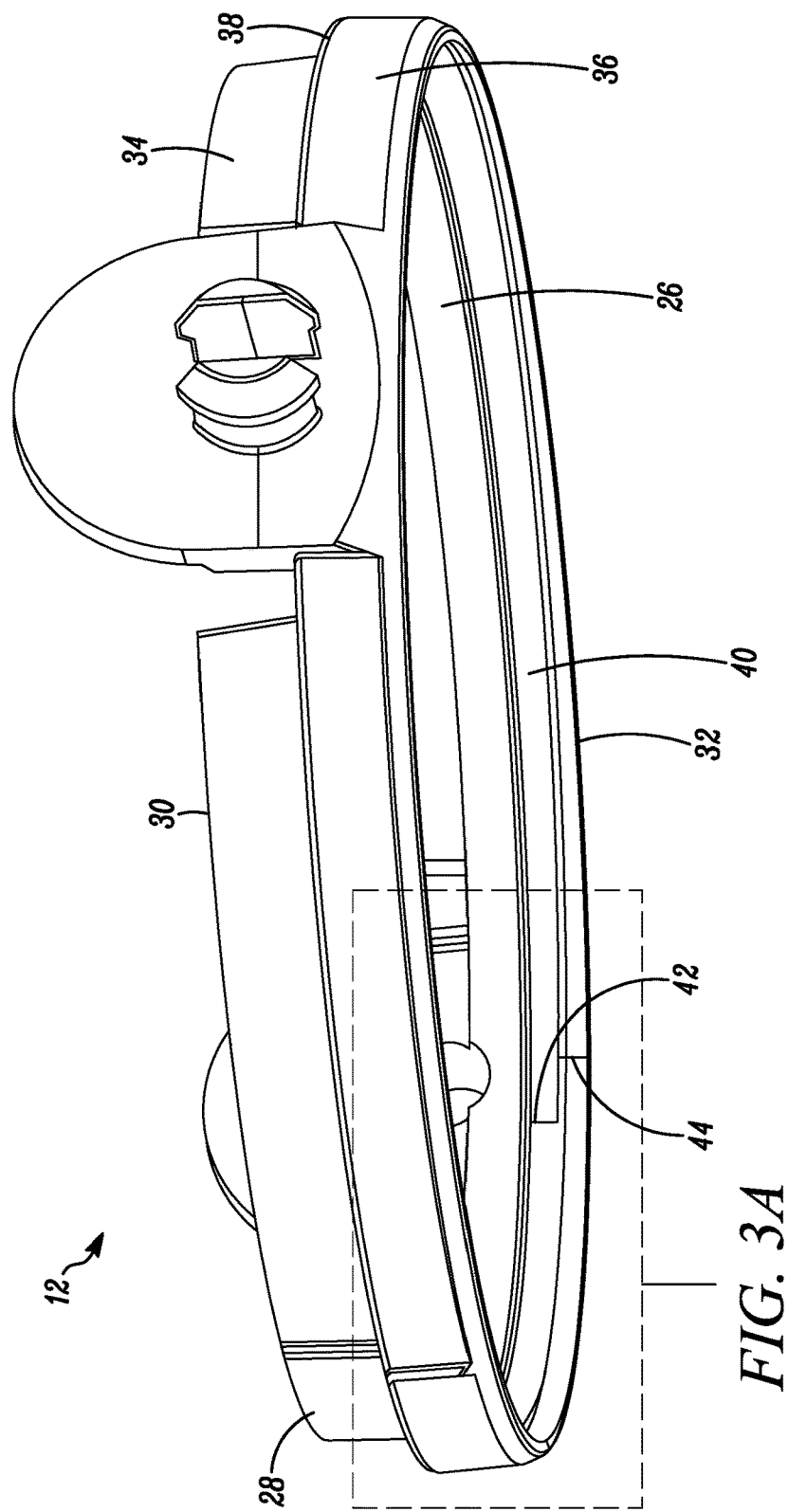
FIG. 3 is a schematic perspective view of a gimbal ring according to an exemplary embodiment.
FIG. 3A is a schematic detail perspective view of a portion of the gimbal ring of FIG. 3.
Figure 3A:
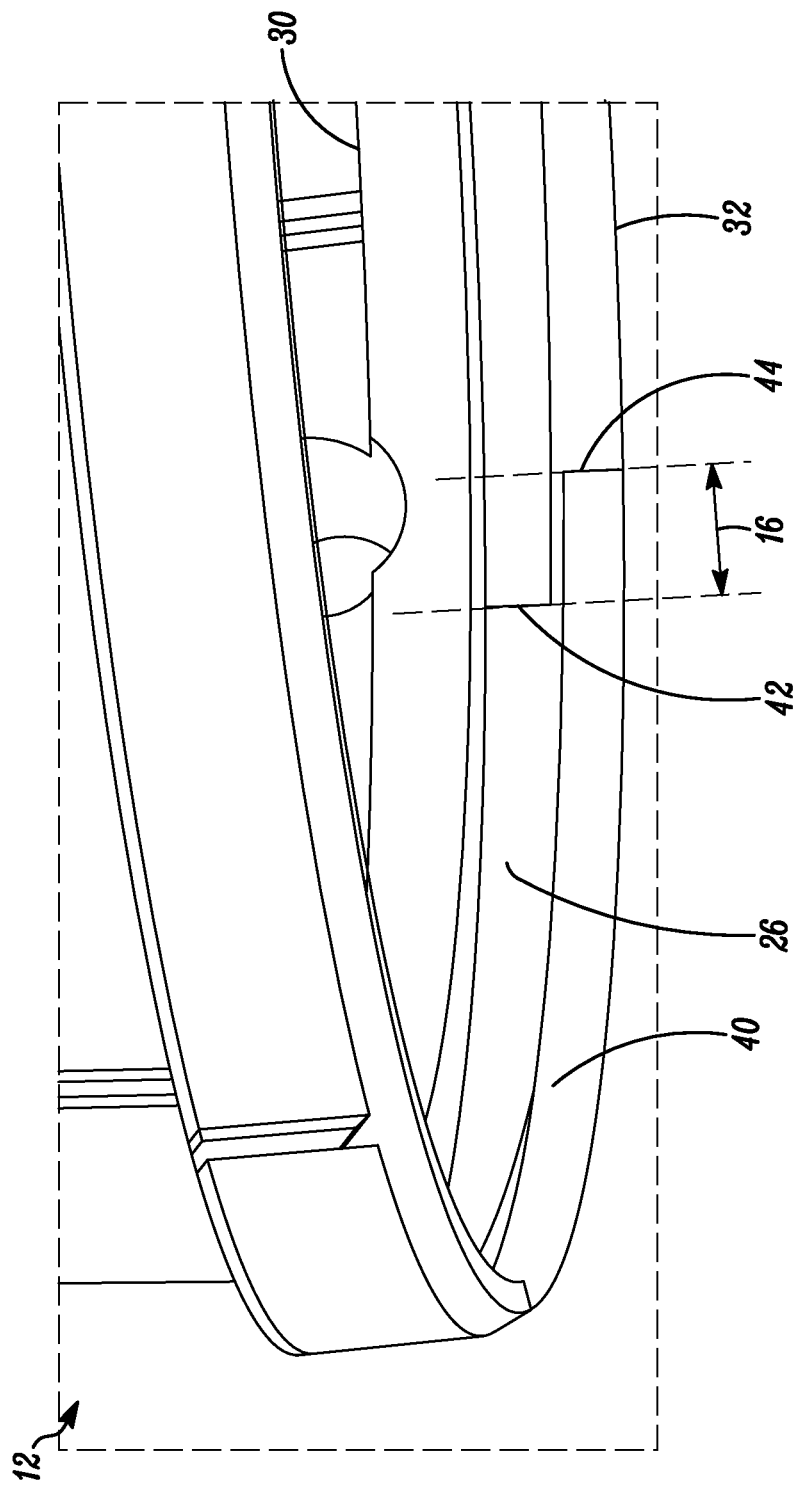

FIG. 3 illustrates gimbal ring 12 according to an exemplary embodiment. As shown schematically in FIG. 3, gimbal ring 12 can have opposing interior and exterior surface 26, 28 and opposing first and second ends 30, 32. Exterior surface 28 of gimbal ring 12 can have a tiered configuration with first curved portion 34 extending from first end 30 towards second end 32 and a second curved portion 36 extending from second end 32 towards first end 30. Second curved portion 36 can have a larger radius than first curved portion 34 and first and second curved portions 34, 36 can be joined together by a shelf or ledge 38 extending outward from the first curved portion 34 to the second curved portion 36.

As illustrated in FIG. 3, interior surface 26 of gimbal ring 12 can be provided with a spiral groove or channel 40 having a length greater than one full revolution around interior surface 26. FIG. 3A illustrates a detail view of a portion of interior surface 26 and spiral channel 40. As shown in FIGS. 3 and 3A, spiral channel 40 can be recessed into the interior surface 26 of gimbal ring 12 and have a starting point 42 and an end point 44 with a length therebetween. As shown in FIG. 3, starting point 42 can be closer to first end 30 of gimbal ring than end point 44 and end point 44 can be closer to second end 32 than starting point 42 thus providing channel 40 with a spiral or corkscrew configuration along its length. In particular, from starting point 42, channel 40 can extend around interior surface 26 of gimbal ring 12 and progressively spiral towards second end 32 of gimbal ring 12.

As channel 40 extends around interior surface 26 it can continue beyond the point on interior surface 26 where starting point 42 is located before terminating at end point 44. Accordingly, as shown in FIGS. 3 and 3A, spiral channel 40 can have an overlapping segment 46 between the starting and end points 42, 44 on interior surface 26. According to embodiments presented herein, it is preferred (but not required) that the spiral channel 40 extend on the order of 370 degrees around interior surface 26 of gimbal ring 12. It will be understood, however, that channel 40 can extend greater than 370 degrees around interior surface 26, or fewer than 370 degrees around interior surface 26, without departing from the scope presented herein. It will be further understood that although FIGS. 3 and 3A illustrate channel 40 spiraling in a clockwise direction as it approaches second end 32 of gimbal ring 12, channel 40 can instead have a counter-clockwise orientation.

Figure 4A:
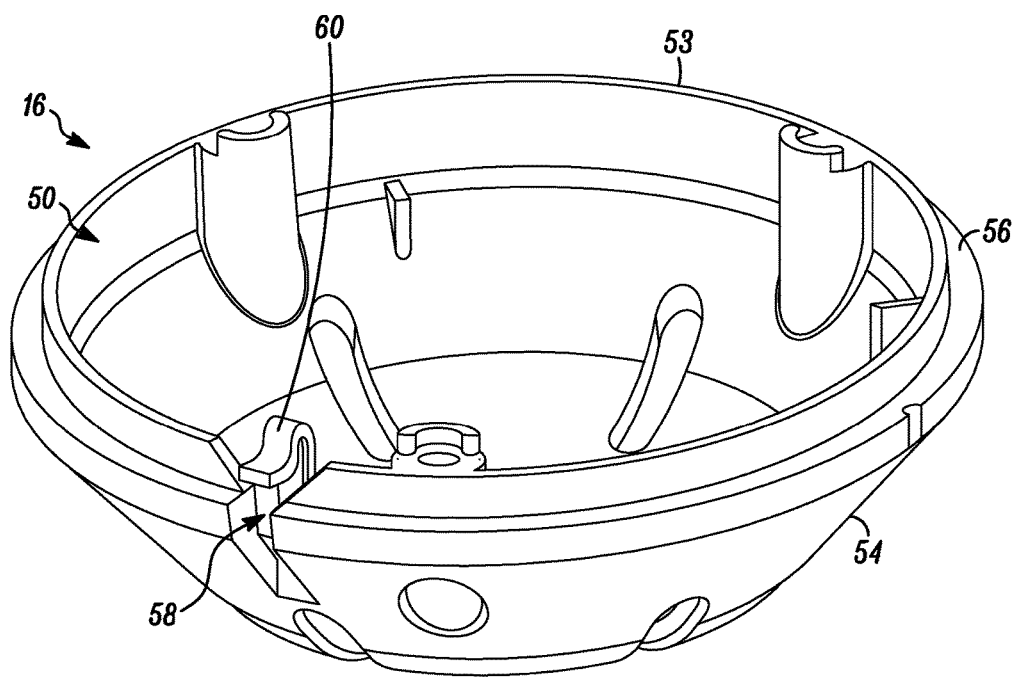
FIG. 4A is a schematic perspective view of a gimbal ring base according to an exemplary embodiment.
Figure 4B:
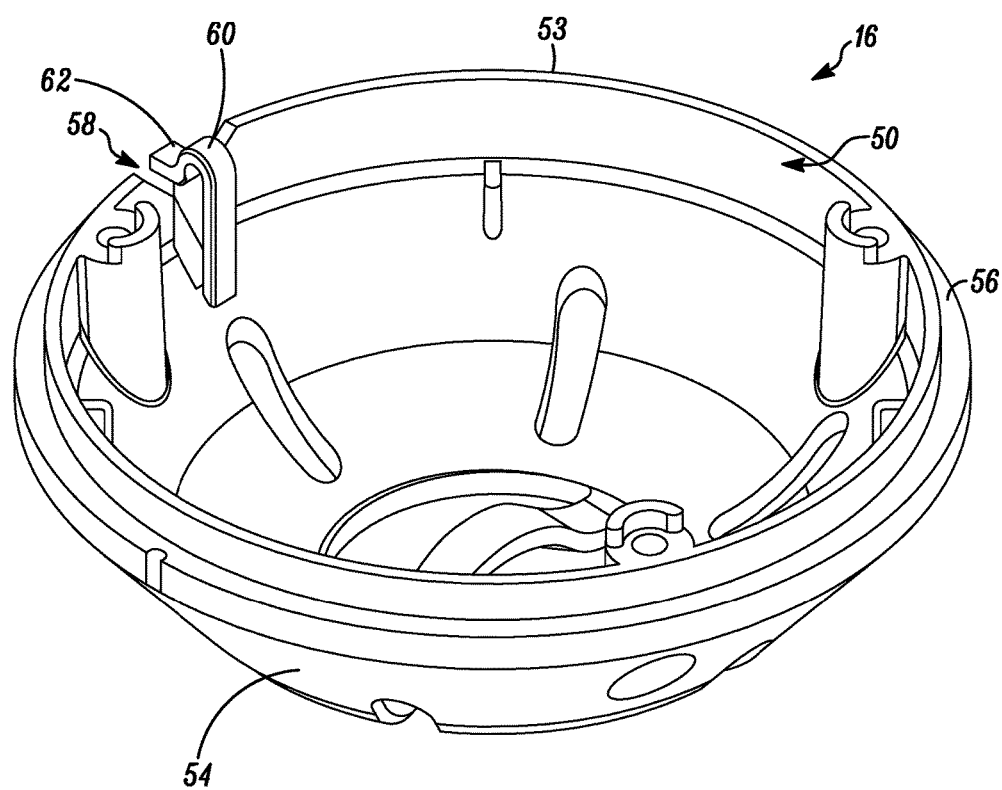
FIG. 4B is a schematic perspective view of a gimbal ring base according to an exemplary embodiment.

FIGS. 4A and 4B illustrate gimbal base 16 according to an exemplary embodiment. As shown schematically in FIGS. 4A and 4B, gimbal base 16 can have a bowl-shaped design featuring an open end 50 with an annular-shaped rim 52 defining a central opening with said opening extending into an interior cavity defined by the side wall 54 of base 16. Side wall 54 can have an interior surface and an exterior surface and can extend away from open end 50 to an end opposite the central opening. As shown in FIGS. 4A and 4B, the side wall 54 of base 16 can progressively taper or curve inward as it extends away from open end 50 with the end opposite the central opening having a smaller diameter than the open end 50; thus providing base with an inverted dome configuration. The end opposite the central opening can be provided with openings or slots which can be configured for receiving cables or wires 20 (see FIG. 1B).

As shown in FIGS. 4A and 4B, base 16 can be provided with a flange 56 extending outwardly from the exterior surface of side wall 54. Flange 56 can extend about the exterior surface of side wall 54. According to an exemplary embodiment as shown in FIGS. 4A and 4B, base 16 may have a slot 58 extending through side wall 54. Slot 58 can have a length extending substantially perpendicular to flange 56 and rim 52 and extend from rim 52 toward the end of base 16 opposite the open end 50. Slot 58 may bisect flange 56 and rim 52 to prevent flange 56 and rim 52 from extending completely around base 16. Slot 58 may have a width substantially parallel to flange 56 and rim 52.

According to an exemplary embodiment, base 16 can be provided with a bendable or flexible pin or hook member 60 such as, for example, a snake hook as shown in FIGS. 4A and 4B which can be located substantially adjacent slot 58. As shown schematically in FIG. 4B, hook member 60 can have a proximal end secured to, or embedded into, the interior surface of side wall 54, a free or distal end opposite the proximal end and an indented or curved portion between the proximal and distal ends. As illustrated in FIG. 4B, hook member 60 can extend from proximal end towards open end 50 of base 16 and beyond rim 52 and the central opening of base 16 into the curved portion. From the curved portion, hook member 60 can be provided with a segment which reverses direction on the order of 180 degrees and extends back towards the proximal end before curving and extend outward through slot 58 and past the exterior surface of side wall 54 to the distal end. Distal end of hook member 60 can form a tab 62 for engaging and sliding within the spiral channel 40 of the gimbal ring 12 (see FIGS. 3 and 3A).

Figure 5:
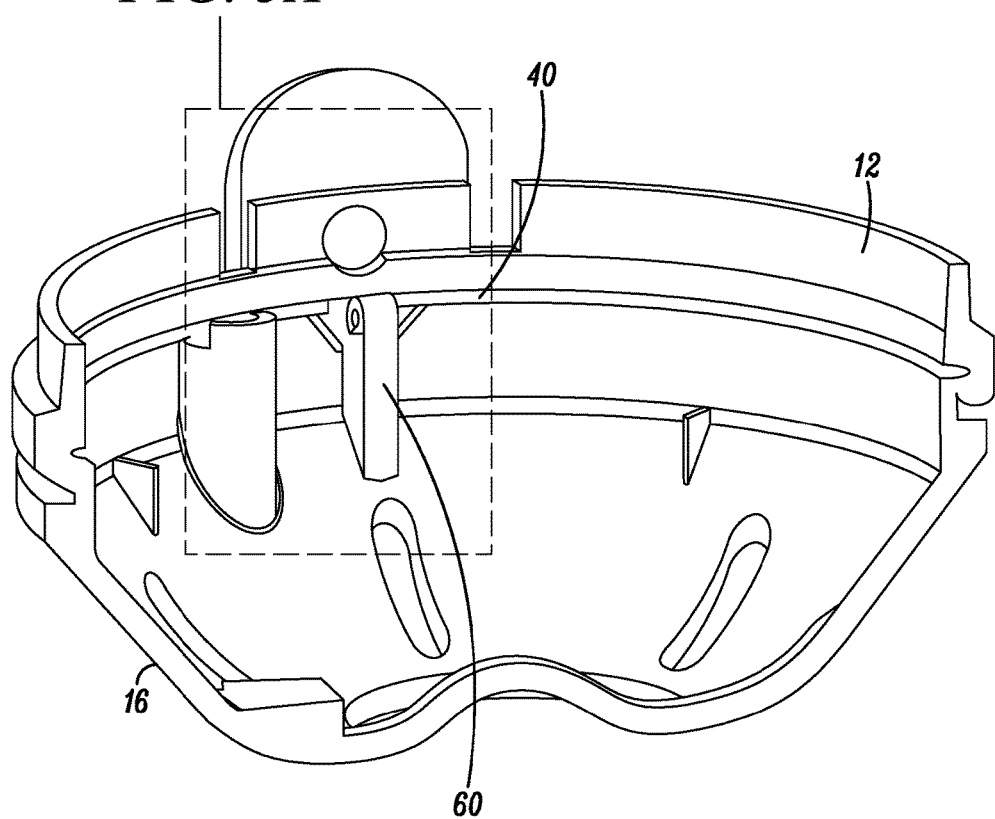
FIG. 5 is a schematic perspective section view of a gimbal ring seated against a gimbal base according to an exemplary embodiment.
Figure 5A:
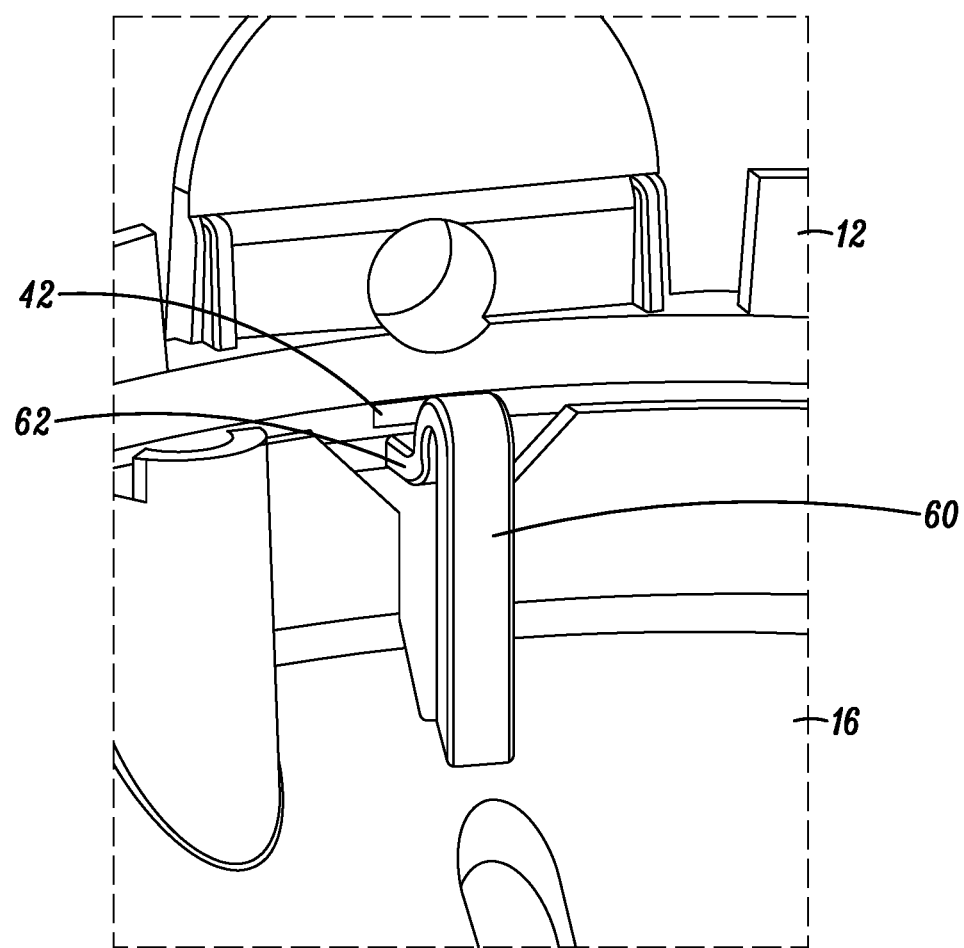
FIG. 5A is a schematic detail perspective view of a portion of the gimbal ring and gimbal base of FIG. 5.

FIG. 5 illustrates gimbal ring 12 secured to, or assembled with, gimbal base 16 according to an exemplary embodiment with FIG. 5A illustrating a detail view of hook member 60 engaged within spiral channel 40. As shown schematically in FIG. 5, when assembled together, gimbal ring 12 can be seated on or around at least a portion of rim 52 with second curved portion 36 of gimbal ring 12 extending along the outer surface of base 16 towards flange 52. According to an exemplary embodiment as shown in FIGS. 5 and 5A, gimbal ring 12 can be rotatable relative base 16; spiral channel 40 can be configured to receive outwardly extending tab 62 of hook member 60 with tab 62 slidably engaging channel 40 such that rotation of ring 12 relative base causes channel 40 to rotationally slide around tab 62 between start and end points 42, 44 of channel 40.

Figure 6A:
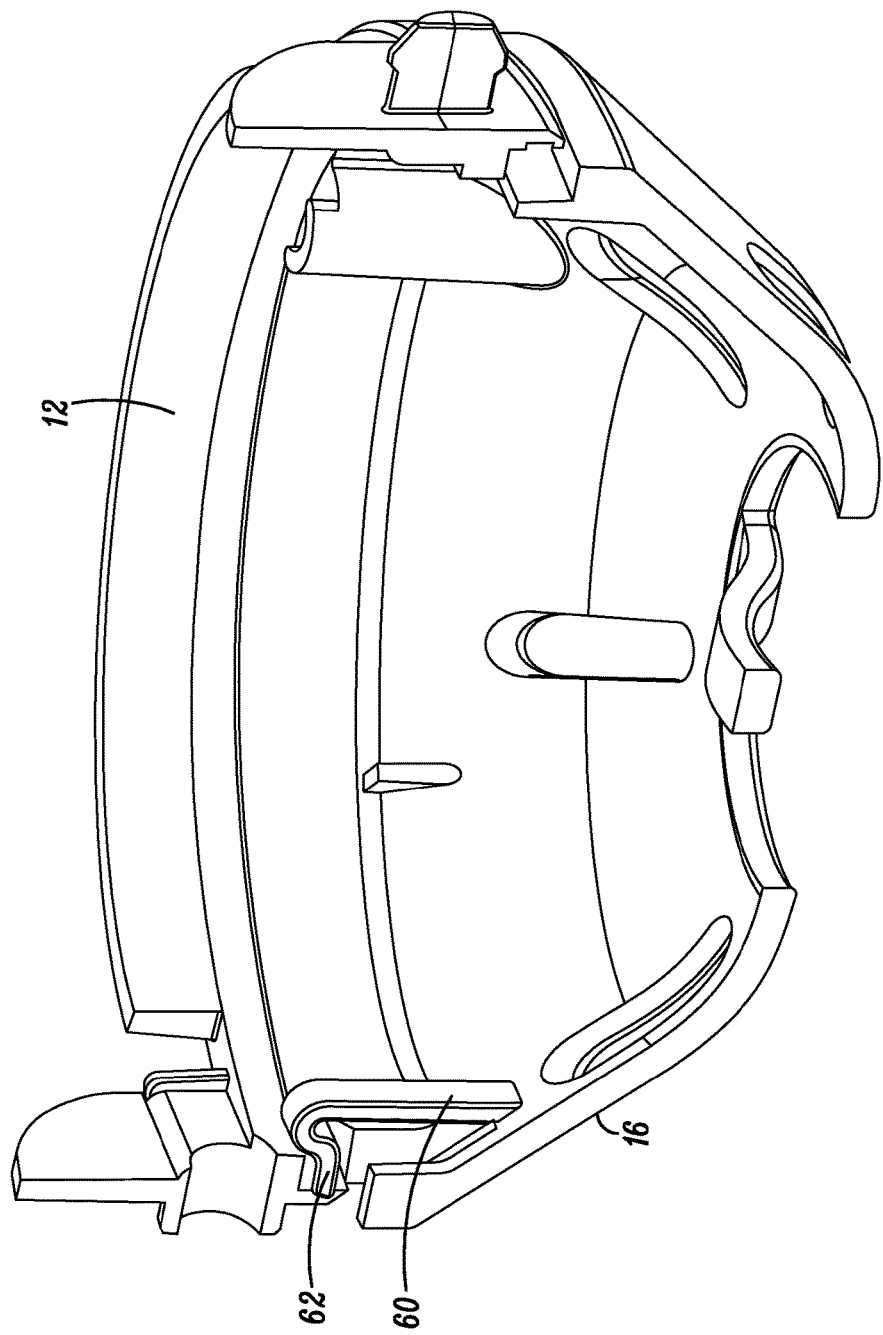
FIG. 6A is a schematic perspective section view of a gimbal ring seated against a gimbal base according to an exemplary embodiment.
Figure 6B:
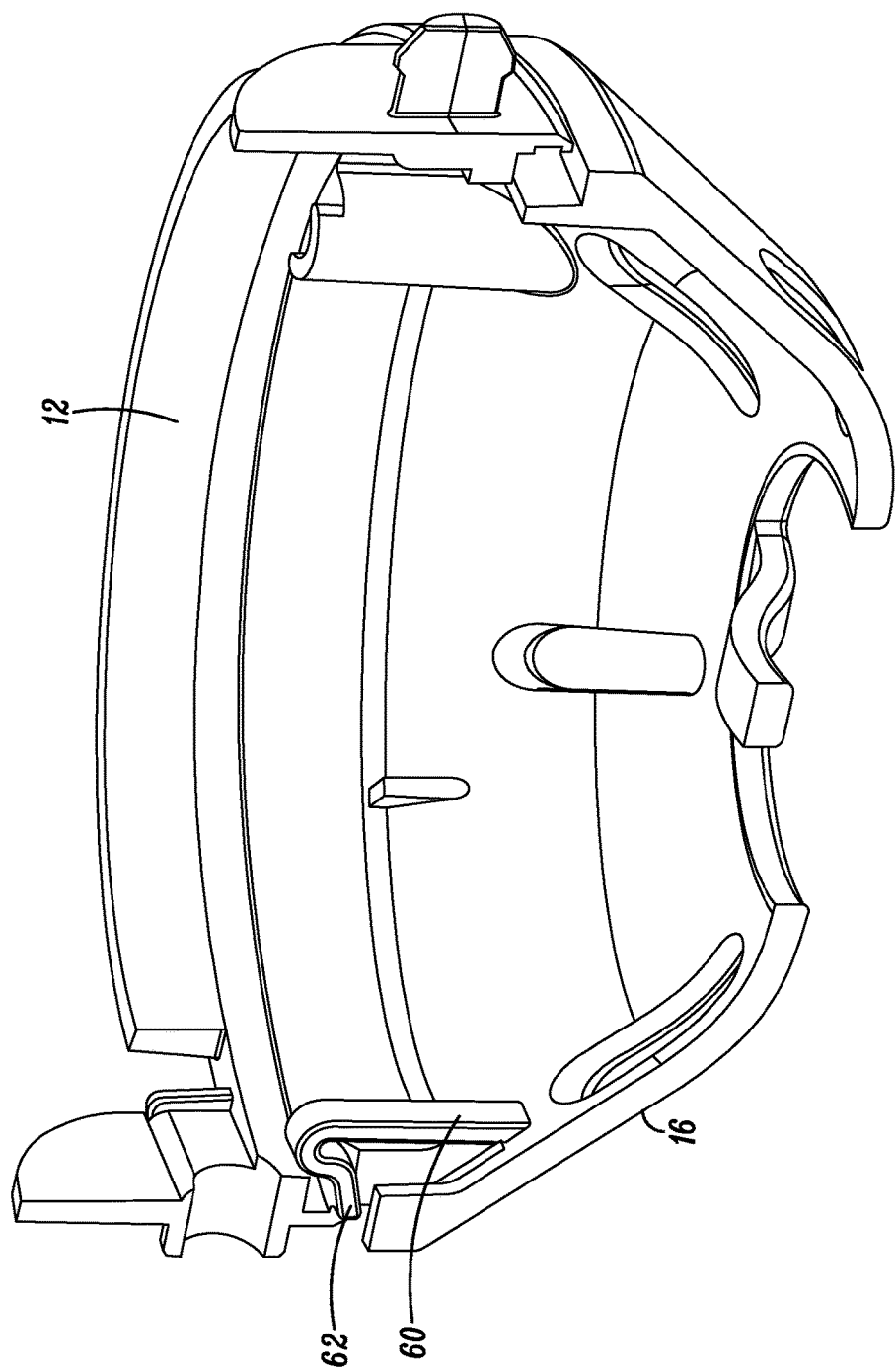
FIG. 6B is a schematic perspective section view of a gimbal ring seated against a gimbal base according to an exemplary embodiment.

It will be recognized that rotation of ring 12 relative base 16 can cause the sides of spiral channel 40 to engage and exert force on the tab 62 with the elastic properties/characteristics of hook member 60 causing tab and/or hook member to flex and/or pivot. It has been shown that such flexing can enable tab 62 to stay engaged within channel 40 during rotation of ring 12 relative base. FIGS. 6A and 6B illustrate tab 62 of hook member 60 flexing and/or pivoting within channel according to an exemplary embodiment.

FIGS. 5 and 5A illustrate tab 62 of hook member 60 positioned against end point 44 of channel 40. According to an exemplary embodiment, engagement of tab 62 against end point 44 will restrict further counter-clockwise rotation of ring 12 relative base with end point 44 acting a stop which can restrain tab 62 and prevent further rotation in the counter-clockwise direction—thus, impeding unlimited or indefinite rotation in the respective direction. In particular, when moved into the position shown in FIGS. 5 and 5A, rotation of gimbal ring 12 relative base 16 is limited to the opposing clockwise direction.

It will be understood that clockwise rotation of ring 12 relative base 16 from a position as shown in FIGS. 5 and 5A can cause tab 62 to track within channel 40 and follow the spiral path of channel 40 away from the second end 32 of ring 12—with such rotation causing ring 12 to rotate further onto/into base and continue until tab 62 of hook member 60 reaches and is engaged by opposing start point 42 of spiral channel 40. As described above, the configuration of the spiral channel 40 and position of the start and end points 42, 44 can enable rotation of ring 12 relative base on the order of 370 degrees with such rotation causing camera to pivot or rotate about the Z axis (see FIG. 1A). Upon engaging tab 62, start point 42 can impede further clockwise rotation of ring 12 relative base 62 thus restricting unlimited or indefinite rotation in the clockwise direction.

FIG. 6A illustrates tab 60 of hook member 60 flexing or pivoting upward within the slotted channel of gimbal ring 12. It will be recognized that such condition can be produced when tab 62 engages the side of slotted channel 40 with such engagement pushing on the bottom surface of tab 62. According to an exemplary embodiment as shown in FIG. 6A, it will be recognized that such condition can be produced where gimbal ring 12 is rotating relative base 16 in a direction where slotted channel is spiraling away from base 16; such rotation causing the side of the slotted channel against the bottom of tab 62 to exert upward force on tab 62 to push or flex tab 62 upward. FIG. 6B illustrates tab 60 of hook member 60 flexing or pivoting downward within the slotted channel of gimbal ring 12. It will be recognized that such condition can be produced when tab 62 engages the side of slotted channel 40 with such engagement pushing on the top surface of tab 62. According to an exemplary embodiment as shown in FIG. 6B, it will be recognized that such condition can be produced where gimbal ring 12 is rotating relative base 16 in a direction where slotted channel is spiraling towards base 16 with such rotation causing the side of the slotted channel against the top of tab 62 exerting downward force on tab 62 to push or flex tab 62 downward. It has been shown that a flexible hook member 60 demonstrating such elasticity can enable tab 62 to stay engaged within the slotted channel and further help guide rotation of ring 12 relative base 16.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

What is claimed is:

1. An assembly for a rotatable surveillance camera comprising:
   a gimbal ring having an annular interior surface provided with a slotted channel recessed therein, the slotted channel having opposing first and second ends and a length therebetween, the slotted channel having a spiral configuration along the interior surface and extending around the interior surface at least one full revolution between the opposing first and second ends;
   a gimbal base having an annular rim defining a central opening and a body having at least one side wall defining an interior portion, the annular rim being securable against the gimbal ring, a slot being provided through at least a portion of the at least one side wall;
   a flexible hook member secured to the gimbal base, the hook member having a proximal end and a distal end, the proximal end of hook member being secured to the interior portion of the gimbal base, the hook member extending from the proximal end through the slot to the distal end outside of the gimbal base, a tab being formed on the distal end of the flexible hook member, the tab being engagable within the slotted channel, and
   wherein the slotted channel is configured for receiving the tab of the hook member and being slidably rotated around said tab between the opposing first and second ends during rotation of the gimbal ring relative the gimbal base.

2. The assembly of claim 1 further comprising a camera securable to at least one of the gimbal ring and the gimbal base.

3. The assembly of claim 1 wherein the length of the slotted channel is configured to permit rotation of the gimbal ring relative the gimbal base, said rotation being on the order of 370 degrees.

4. The assembly of claim 1 wherein engagement of the tab against the first end of the slotted channel restricts continued rotation of the gimbal ring relative the gimbal base in a first direction being at least one of a clockwise and counterclockwise direction.

5. The assembly of claim 4 wherein engagement of the tab against the second end of the slotted channel restricts continued rotation of the gimbal ring relative the gimbal base in a second direction being at least one of a clockwise and counterclockwise direction, the second direction being different from the first direction.

6. The assembly of claim 1 further comprising a support structure, the gimbal ring having tabs outwardly extending from opposing sides thereof, the tabs being configured for being received and supported by arms of the support structure.

7. The assembly of claim 1 further comprising a camera assembly securable to the assembly for the rotatable surveillance camera, the camera assembly supporting a rotatable surveillance camera and being provided with a drive mechanism, a controller and associated control circuitry.

8. A rotatable surveillance camera comprising:
   a stationary support structure securable to a mounting surface;
   a rotatable gimbal ring supported by the stationary support structure, the gimbal ring having an annular interior surface provided with a slotted channel recessed therein, the slotted channel having opposing first and second ends and a length therebetween, the slotted channel having a spiral configuration along the interior surface and extending around the interior surface at least one full revolution between the opposing first and second ends;
   a gimbal base having an annular rim defining a central opening and a body having at least one side wall defining an interior portion, the annular rim being securable against the gimbal ring, a slot being provided through at least a portion of the at least one side wall extending from the rim;

a flexible hook member secured to the gimbal base, the hook member having a proximal end and a distal end, the proximal end of hook member being secured to the interior portion of the gimbal base, the hook member extending from the proximal end through the slot to the distal end outside of the gimbal base, a tab being formed on the distal end of the flexible hook member, the tab being engagable within the slotted channel;

a camera assembly having a rotatable camera, the camera assembly being securable to a portion of at least one of the gimbal ring and gimbal base opposite the stationary support structure;

wherein the slotted channel is configured for receiving the tab of the hook member and being slidably rotated around said tab between the opposing first and second ends during rotation of the gimbal ring relative the gimbal base.

9. The rotatable surveillance camera of claim 8 wherein the length of the slotted channel is configured to permit rotation of the gimbal ring relative the gimbal base, said rotation being on the order of 370 degrees.

10. The rotatable surveillance camera of claim 8 wherein engagement of the tab against the first end of the slotted channel restricts continued rotation of the gimbal ring relative the gimbal base in a first direction being at least one of a clockwise and counterclockwise direction.

11. The rotatable surveillance camera of claim 10 wherein engagement of the tab against the second end of the slotted channel restricts continued rotation of the gimbal ring relative the gimbal base in a second direction of the at least one of the clockwise and counterclockwise direction, the second direction being different from the first direction.

12. The rotatable surveillance camera of claim 8 wherein the gimbal ring is provided with tabs outwardly extending from opposing sides thereof, the tabs being configured for being received and supported by arms of the stationary support structure.

13. The rotatable surveillance camera of claim 8 further comprising a drive mechanism, a controller and associated control circuitry, rotation of the gimbal ring relative the gimbal base being actuated by the drive assembly.

14. A method of restricting indefinite one-way rotation of rotatable camera assembly comprising:
providing a rotatable gimbal ring having an annular interior surface with a slotted channel recessed therein, the slotted channel having a spiral configuration along its length between opposing ends and extending around the interior surface at least one full revolution between the opposing first and second ends;
providing a flexible hook member affixed to a stationary member seated against the gimbal ring, the flexible hook member having an end with a tab outwardly extending from the stationary member;
receiving the tab within the slotted channel;
rotating the gimbal ring relative the stationary member in a first direction, the first direction being at least one of a clockwise and counterclockwise direction;
sliding the slotted channel around the tab;
engaging a first end of the opposing ends of the slotted channel against the tab, said engagement restricting further rotation of the gimbal ring in the first direction.

15. The method of claim 14 further comprising rotating the gimbal ring relative the stationary member on the order of 370 degrees.

16. The method of claim 14 wherein rotation of the gimbal ring relative the stationary member actuates rotation of a camera assembly securable to at least one of the gimbal ring and stationary structure about an axis of rotation.

17. The method of claim 14 further comprising:
rotating the gimbal ring relative the stationary member in a second direction opposite the first direction, and
engaging a second end of the opposing ends of the slotted channel against the tab, the second end being different from the first end, said engagement restricting continued rotation of the gimbal ring in the second direction.

* * * * *